United States Patent [19]

Gee et al.

[11] Patent Number: 4,750,979

[45] Date of Patent: Jun. 14, 1988

[54] PROCESS FOR ETCHING LITHIUM NIOBATE BASED DEVICES WITHOUT DAMAGING OPTICAL WAVEGUIDES

[75] Inventors: Caroline M. Gee, Woodland Hills; Hugh L. Garvin, Malibu, both of Calif.

[73] Assignee: Hughes Aircraft Company, Los Angeles, Calif.

[21] Appl. No.: 674,811

[22] Filed: Nov. 26, 1984

[51] Int. Cl.$^4$ .............................................. C23C 14/34
[52] U.S. Cl. ........................... 204/192.3; 204/192.26; 204/192.32; 204/192.34; 204/192.35; 156/643; 156/646; 156/667
[58] Field of Search ............ 204/192.1, 192.11, 192.26, 204/192.27, 192.28, 192.29, 192.3, 192.32, 192.34, 192.35; 156/643, 646, 667, 656

[56] References Cited

U.S. PATENT DOCUMENTS

| | | | |
|---|---|---|---|
| 3,479,269 | 11/1969 | Byrnes, Jr. et al. ............ | 204/192.32 |
| 3,795,557 | 3/1974 | Jacob ............................ | 204/192.32 |
| 4,136,212 | 1/1979 | Auracher et al. ................ | 427/38 |
| 4,337,132 | 6/1982 | Jones .............................. | 204/192.35 |
| 4,354,911 | 10/1982 | Dodd et al. ...................... | 204/192.3 |
| 4,427,515 | 1/1984 | Yuhara et al. ................... | 204/192.35 |

*Primary Examiner*—John F. Niebling
*Assistant Examiner*—Nam X. Nguyen
*Attorney, Agent, or Firm*—V. D. Duraiswamy; V. G. Laslo; A. W. Karambelas

[57] ABSTRACT

The present invention provides a method of preparing the surface of a lithium niobate substrate (10) having titanium optical waveguides (12) for a subsequent deposition of a coating material such as electrodes. This cleaning or etching step prior to the deposit of desired coating materials is accomplished without deterioration of the transmission capacities of the optical waveguides (12). The substrate cleaning step of the present invention comprises the introduction of a predetermined amount of oxygen (16) at a controlled rate to provide a predetermined atmospheric environment surrounding the lithium niobate substrate (10). The subsequent etching of the substrate surface to a predetermined depth, for example, by argon ion bombardment, provides minimal damage to the optical waveguides while still producing an excellently cleaned surface preparatory for receiving subsequent layer depositions such as the electrodes.

7 Claims, 1 Drawing Sheet

PROCESS FOR ETCHING LITHIUM NIOBATE BASED DEVICES WITHOUT DAMAGING OPTICAL WAVEGUIDES

BACKGROUND OF THE INVENTION

The production of electro-optical devices such as $LiNbO_3$ substrates supporting titanium-diffused waveguides with minimal optical losses is a desired goal in the electro-optical field. More specifically, it is highly desirable to provide such optical waveguides that can be proficiently manufactured with superior adhesion of substrate coatings and electrodes without deteriorating the transmission characteristics of the optical waveguides.

The desirability of providing improved manufacturing processes for producing optical waveguides in an economical manner is well appreciated in the prior art. The advantage of optical waveguides and their integration in electro-optical devices is well known, and has become even more significant in the miniaturization of various electro-optical devices. Such systems are described, e.g., by S. E. Miller in "Integrated Optics: An Introduction," *Bell System Technical Journal*, Vol. 48 (1969), pp. 2059–2069, and they can be manufactured by techniques such as described by E. G. Spencer et al., "Ion Beam Techniques for Device Fabrication," *Journal of Vacuum Science and Technology*, Vol. 8 (1972), pp. 552–570. The prior art has further recognized the advantages of utilizing lithium niobate ($LiNbO_3$) substrates having diffused titanium waveguides developed adjacent their surfaces. The ability to provide various switching arrangements by depositing electrode material across the waveguides has also been appreciated in the prior art, such as U.S. Pat. No. 4,184,738. The optimum production of these electro-optical devices is still a significant challenge to the prior art.

Lithium niobate substrates are generally cleaned by solvents and blown dry with nitrogen. Chemical cleaning, however, has the capacity of leaving trace contaminants of chemicals on the surface of the substrate. Even if the substrates were properly cleaned by chemicals, there was still the possibility of contamination by the transporting of the substrates to the deposition site. The prior art was also aware of the ability to pre-etch a substrate with argon ions preparatory for the depositing of a layer of material on the substrate. This pre-etching step, however, could not be utilized with a lithium niobate substrate having developed optical waveguides, because it would damage the transmission capacities of the waveguides.

Thus, the prior art is still seeking improvements in the manufacturing of lithium niobate substrates with optical waveguides and improved electro-optical devices with minimal throughput loss.

SUMMARY OF THE INVENTION

The present invention provides a method of preparing the surface of a lithium niobate substrate having titanium optical waveguides patterned on the substrate for a subsequent deposition of a coating material, such as electrodes. This cleaning or etching step prior to the depositing of the desired coating material must be accomplished without any deterioration of the transmission capacities of the optical waveguides.

The integrated optics devices that are based on lithium niobate require both a good optical throughput, and frequently, high quality stripline electrodes. To achieve both these requirements, the lithium niobate substrate surface must be thoroughly cleaned before the electrode fabrication without damaging the optical waveguides which are positioned adjacent the substrate surface. The surface cleanliness is especially important when a thick layer of material is to be deposited on the substrate, such as electrodes for high speed microwave optical devices. These electrodes are several micrometers thick. The substrate cleaning step of the present invention comprises the introduction of a predetermined amount of oxygen at a controlled rate to provide a predetermined atmospheric environment surrounding the lithium niobate substrate. The subsequent etching of the substrate surface to a predetermined depth, for example, by argon ion bombardment, provides minimal damage to the optical waveguides while still producing an excellently cleaned surface preparatory for receiving subsequent layer depositions, such as the electrodes. The resulting product of this process is a superior optical waveguide device that can be more easily manufactured in a deposition chamber of a sputtering machine.

The features of the present invention, which are believed to be novel, can be best understood, together with further purposes and advantages, by reference to the following description, taken in conjunction with the accompanying drawings.

DESCRIPTION OF THE PREFERRED EMBODIMENT

The following specification, taken in conjunction with the drawings, sets forth the optical waveguide device and process steps of the present invention in such a manner that any person skilled in the electrooptical field can utilize the invention. The embodiment of the invention disclosed herein is the best mode contemplated by the inventors of carrying out their invention, although it should be understood that various modifications can be accomplished within the parameters of the invention.

Figure 1:
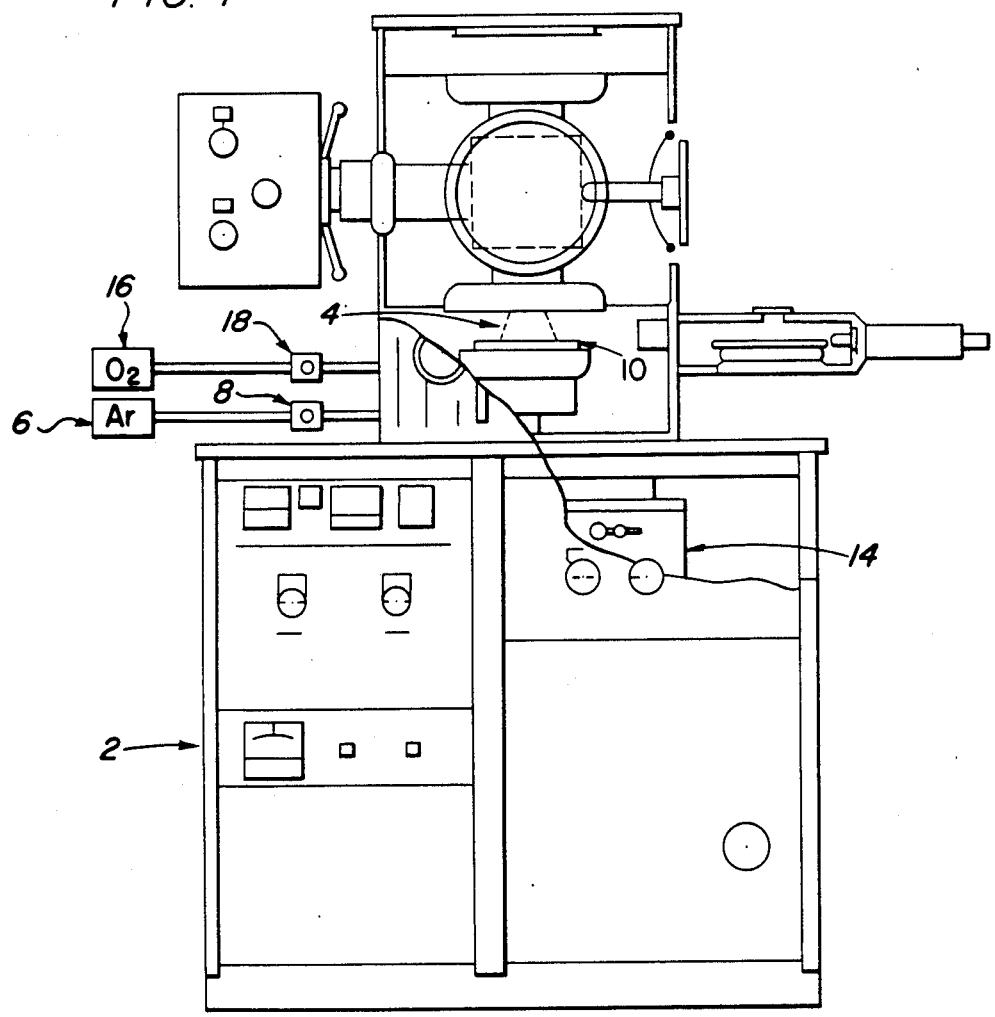
FIG. 1 is a schematic illustration of a sputtering system suitable for the process of the present invention.
Figure 2:
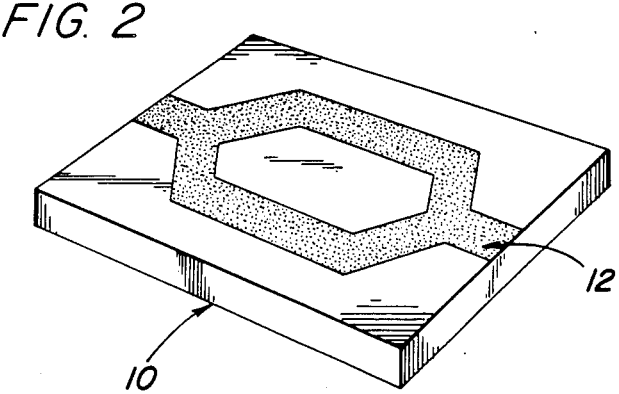
FIG. 2 is a schematic prospective view of a substrate with optical waveguides.

Referring to FIG. 1, a sputtering system 2 is only schematically shown, and can, for example, comprise a conventionally-known Materials Research Corporation RF sputtering machine, Model No. MRC8802. This machine is capable of providing an etching gas plasma, for example, of argon. The argon plasma beam is schematically illustrated as element 4 in the drawing. Mounted beneath the aperture is a lithium niobate ($LiNbO_3$) substrate 10 having the predetermined titanium-diffused waveguides 12 positioned just under and adjacent to its surface as shown in FIG. 2. The vacuum pump 14 is capable of evacuating the chamber and maintaining it at the desired subatmospheric pressure as is well known in the art. An oxygen source 16 can introduce oxygen into the chamber through an appropriate valve mechanism 18, while an argon source 6 can introduce argon through valve mechanism 8.

To prepare the lithium niobate substrate with the titanium-diffused waveguides adjacent its surface for a subsequent deposition of a covering layer, e.g., an electrode, to form a high-speed microwave optical device, it is important that the surface be extremely clean. This is accomplished in the present invention by cleaning the surface by etching with an argon, RF plasma prior to the depositing step. The use of such an argon plasma alone, however, creates a significant problem with the optical waveguides 12, since it produces a metal-rich impregnated layer, thereby causing significant waveguide damage. The present inventors found that this problem can be neutralized by the controlled introduction of a source of oxygen during this etching or cleaning step of the substrate surface with the argon plasma. In the preferred process, oxygen is introduced in a ratio of 2.5 mTorr of oxygen to 3.5 mTorr of argon throughout the cleaning/etching step. Thus, as the lithium niobate substrate 10 surface is cleaned to a predetermined depth, e.g., etched, for example, for a period of approximately two minutes at 150 watts, the atmosphere surrounding the optical waveguides 12 is one of an oxygen-enriched atmosphere to counter the previous deteriorating effects that had been experienced with argon etching. The above time period, power, and pressure measurements of oxygen and argon are based upon the use of the Materials Research Corporation RF sputtering machine, Model No. MRC8802. As can be readily appreciated, variations from these measurements can be accomplished within the state of the art to accommodate other machines and also variations from the preferred embodiment.

To illustrate the advantages of an integrated electrooptical device based on lithium niobate having optical waveguides and electrodes, several samples of substrates with waveguides were fabricated. A series of identical waveguides were fabricated on one substrate by a standard diffusion of titanium into the lithium niobate substrate. A photoresist was then used to mask off half of the series of waveguides on each sample. These masked-off portions were used as control waveguides on each of the samples. These samples were then pre-etched for two minutes by an argon RF plasma at 150 watts. Some of the samples were etched with, and others without, the oxygen atmosphere. Subsequently, 0.25 $\mu$m of $SiO_2$ was deposited on each of the samples. The silicon dioxide coating adhered well to each of the substrates. A test was then run to determine if any waveguide damage was created as a result of the etching process. The optical performance of each of the waveguides was measured. Optical loss measurements of the pre-etched waveguides were compared to those of the waveguides which were on the same sample but masked by the photoresist to be protected from the argon etching. It was found that the waveguides which were pre-etched in oxygen had identical optical outputs to that of the masked waveguides, indicating that the pre-etching did not damage the waveguides. However, when the pre-etching step was performed without the oxygen atmosphere, the optical loss of the waveguides was more than ten times greater than that of the masked waveguides. Accordingly, by etching in the oxygen atmosphere, a significant cleaning process for lithium niobate-based devices was realized, and a superior optical waveguide device was produced.

The exact reason for this improved performance is not fully understood, and the following analysis is offered simply as supplemental information without a limitation on the actual perceived results that have been experienced. It is believed that the oxygen-enriched atmosphere stabilizes any oxygen ions that have been released as a result of the impacting of the argon ions against the substrate. Thus, the free oxygen adjacent the substrate can reoxidize the surface and thereby neutralize the effect of the argon ion impacts.

As can be readily appreciated, the present invention provides a method of forming an electrooptical device having optical waveguides and electrodes wherein a lithium niobate substrate is positioned within a depositing chamber of an ion beam sputtering system. Titanium can be diffused into the substrate through an appropriate pattern mask to form the optical waveguides. The substrate can then be cleaned to prepare that surface for the deposition of an electrode material. The cleaning step comprises the introduction of oxygen into the depositing chamber, for example, in a ratio of approximately 2.5 mTorr of oxygen to 3.5 mTorr of argon. The pressure of oxygen and argon in the system can vary from about 1.5 mTorr to about 4 mTorr for each gas for a variation of oxygen to argon ratio from about 1.5/4 up to 4/1.5. If the total oxygen and argon pressure is too low, e.g., below 1.5 mTorr, then it is difficult to maintain a plasma discharge. If the oxygen concentration is too high, e.g., above 4 mTorr, then other forms of contamination or degradation can occur.

The etching of the substrate surface for cleaning purposes can be accomplished for a period of approximately two minutes at 150 watts. It is believed that the duration of time and the amount of power are interrelated and can be varied to achieve the same results within certain limits or ranges. The power supplied to the plasma discharge must be sufficient to maintain a discharge within the chamber and provide a slight bombardment of the target material in order to remove about 50–100 angstroms of material. However, the desire to maintain substrate stoichiometry and not severely degrade any masking materials places an outside limit to the power employed for etching. In the presence of oxygen, resists used for masking can be excessively oxidized with high power etching. Therefore, there is an upper limit to the power the system can employ. This upper limit depends on the presence of resists that can be damaged and on the desire to confine material removal (etching) within the 50 to 100 angstrom range and leave the remaining material untouched.

The oxygen-enriched atmosphere is then evacuated from the depositing chamber. Subsequently, the electrode material can be sputtered on the substrate in the desired pattern with a minimal optical loss being incurred in the optical waveguides. This method produces an improved optical waveguide device that can be characterized by those process steps of introducing the oxygen during the cleaning/etching step to provide a superior electro-optical device.

By adhering to the parameters and design considerations set forth in the above specification, a technician in the electro-optical arts is capable of providing an improved optical waveguide device by utilizing the process steps of the present invention. While the parameters of the present invention can be found in the above example, this example of the preferred embodiment should not be considered limiting, but rather illustrative of the advantages of the present invention.

What is claimed is:

1. A method of preparing the surface of a substrate with optical waveguides for subsequent deposition of electrodes comprising the steps of:

providing a $LiNbO_3$ substrate having optical waveguides therein;

providing an inert gas environment capable of forming a plasma surrounding said LiNbO$_3$ substrate;

introducing oxygen into the inert gas environment to form an oxygen-enriched environment surrounding the substrate, and etching the substrate surface to a predetermined depth by ion bombardment in the presence of the oxygen-enriched environment whereby minimal optical loss is incurred in the optical waveguides.

2. The method of claim 1 wherein the environment comprises oxygen and argon having a ratio of approximately 2.5 mTorr of oxygen to 3.5 mTorr of argon.

3. The method of claim 1 wherein the etching is for a period of two minutes at 150 watts.

4. The method of claim 1 wherein oxygen constitutes approximately 45% of the environment and the substrate surface is etched to a depth between 50 to 100 angstroms.

5. A method of forming an electro-optical device having optical waveguides and electrodes comprising the steps of:

placing an LiNbO$_3$ substrate having titanium diffused optical waveguides patterned adjacent the surface into a deposition chamber of an RF plasma sputtering system;

cleaning the substrate to prepare the surface for the deposition of an electrode material including:

(a) introducing oxygen and argon into the deposition chamber to create an oxygen-enriched environment in the depositing chamber wherein oxygen and argon are each within the pressure range of between 1.5 to 4 mTorr; and (b) etching the substrate surface with argon ions in the presence of the oxygen-enriched environment in the depositing chamber;

evacuating the depositing chamber of the oxygen-enriched environment; and sputtering the electrode material on the substrate whereby minimal optical loss is incurred in the optical waveguides.

6. The method of claim 5 wherein the etching of the substrate surface is accomplished for a period of approximately two minutes at 150 watts.

7. A method of forming an electro-optical device having an optical waveguide and an electrode in an RF plasma sputtering machine with a depositing chamber comprising the steps of:

placing an LiNbO$_3$ substrate having titanium diffused optical waveguides patterned adjacent the surface into the depositing chamber of the RF plasma sputtering system;

cleaning the substrate to prepare the surface for the deposition of an electrode material with an inert gas plasma including:

(a) introducing argon into the depositing chamber;

(b) introducing oxygen into the depositing chamber to form an oxygen-enriched atmosphere to constitute less than 50 percent of the total pressure but greater than 30 percent of the total pressure of the depositing chamber;

(c) etching the substrate surface with a plasma of argon ions in the presence of the oxygen-enriched atmosphere in the depositing chamber in a pressure range 1.5 to 4 mTorr;

evacuating the depositing chamber of the oxygen-enriched atmosphere; and sputtering the electrode material on the substrate whereby minimal optical loss is incurred in the optical waveguides.

* * * * *